US008389648B2

(12) United States Patent
Adoni et al.

(10) Patent No.: US 8,389,648 B2
(45) Date of Patent: *Mar. 5, 2013

(54) POLYSILOXANE-POLYCARBONATE COMPOSITIONS, METHOD OF MANUFACTURE, AND ARTICLES FORMED THEREFROM

(75) Inventors: Purushotham Adoni, Bangalore (IN); Dibakar Dhara, West Bengal (IN); Sriramakrishna Maruvada, Evansville, IN (US); Roopali Rai, Bangalore (IN); Veeraraghavan Srinivasan, Bangalore (IN)

(73) Assignee: Sabic Innovative Plastics IP B.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,599

(22) Filed: Aug. 2, 2011

(65) Prior Publication Data

US 2011/0288214 A1  Nov. 24, 2011

Related U.S. Application Data

(63) Continuation of application No. 12/142,861, filed on Jun. 20, 2008, now Pat. No. 7,994,254.

(51) Int. Cl.
*C08L 83/06* (2006.01)
*C08L 85/00* (2006.01)

(52) U.S. Cl. ........ 525/464; 524/158; 524/162; 525/431; 264/328.1; 264/523

(58) Field of Classification Search .................. 524/158, 524/162; 525/464, 431; 264/328.1, 523
See application file for complete search history.

(56) References Cited

U.S. PATENT DOCUMENTS

| | | |
|---|---|---|
| 2,562,000 A | 7/1951 | Sveda |
| 3,185,719 A | 5/1965 | Prober |
| 3,383,092 A | 5/1968 | Cazier |
| 3,671,487 A | 6/1972 | Abolins |
| 3,723,373 A | 3/1973 | Lucas |
| 3,847,867 A | 11/1974 | Heath et al. |
| 3,850,885 A | 11/1974 | Takekoshi et al. |
| 3,852,242 A | 12/1974 | White |
| 3,855,178 A | 12/1974 | White et al. |
| 3,972,902 A | 8/1976 | Heath et al. |
| 3,983,093 A | 9/1976 | Williams, III et al. |
| 4,387,193 A | 6/1983 | Giles, Jr. |
| 4,443,591 A | 4/1984 | Schmidt et al. |
| 4,455,410 A | 6/1984 | Giles, Jr. |
| 4,604,477 A | 8/1986 | Rich |
| 4,690,997 A | 9/1987 | Cella et al. |
| 4,709,054 A | 11/1987 | Rich |
| 4,795,680 A | 1/1989 | Rich et al. |
| 4,808,686 A | 2/1989 | Cella et al. |
| 4,816,527 A | 3/1989 | Rock |
| 4,916,194 A | 4/1990 | Policastro et al. |
| 4,920,191 A | 4/1990 | Langer et al. |
| 4,945,147 A | 7/1990 | Policastro et al. |
| 4,945,148 A | 7/1990 | Rich et al. |
| 5,051,483 A | 9/1991 | Rock et al. |
| 5,385,970 A | 1/1995 | Gallucci et al. |
| 5,521,230 A | 5/1996 | Bhatia et al. |
| 5,986,016 A | 11/1999 | Puyenbroek et al. |
| 6,204,313 B1 | 3/2001 | Bastiaens et al. |
| 6,221,940 B1 | 4/2001 | Puyenbroek et al. |
| 2004/0232598 A1 | 11/2004 | Donea et al. |
| 2007/0048527 A1* | 3/2007 | Agarwal et al. ............... 428/412 |
| 2007/0049706 A1 | 3/2007 | Siripurapu et al. |
| 2007/0100088 A1 | 5/2007 | Gallucci et al. |
| 2007/0191518 A1 | 8/2007 | Chen et al. |
| 2007/0232744 A1 | 10/2007 | Volkers et al. |
| 2008/0015292 A1 | 1/2008 | Lens et al. |

FOREIGN PATENT DOCUMENTS

| | | |
|---|---|---|
| EP | 0303843 A2 | 2/1989 |
| EP | 0307670 A1 | 3/1989 |
| EP | 0519657 A1 | 12/1992 |
| EP | 0636655 A2 | 2/1995 |
| EP | 0926201 A1 | 6/1999 |
| EP | 0926202 A1 | 6/1999 |
| WO | WO2004104104 A1 | 12/2004 |
| WO | WO2007024456 A1 | 3/2007 |
| WO | WO2007035381 A1 | 3/2007 |
| WO | WO2007053307 A1 | 5/2007 |

OTHER PUBLICATIONS

International Search Report mailed Aug. 31, 2009, PCT/US2009/04563, 3 pages.
International Preliminary Report on Patentability mailed Dec. 21, 2010 for PCT/US2009/045363, 6 pages.
Written Opinion for International Search Report mailed Aug. 31, 2009 for PCT/US2009/045363, 6 pages.
ASTM E 313-00, "Standard Practice for Calculating Yellowness and Whiteness Indices from Instrumentally Measured Color Coordinates," pp. 1-5 (2001).
ASTM D 256-06a, Standard Test Method for Determining the Izod Pendulum Impact Resistance fo Plastics, pp. 1-20 (2006).
ASTM D 1003-00, "Standard Test Method for Haze and Luminous Transmittance of Transparent Plastics," pp. 1-6 (2000).
ASTM D 1238-01, "Standard Test Method for Melt Flow Rates of Thermoplastics by Extrusion Plastometer," pp. 1-12 (2001).
ASTM D 1925-70, "Standard Test Method for Yellowness Index of Plastics," pp. 1-3 (1970).

(Continued)

*Primary Examiner* — Ling Choi
*Assistant Examiner* — Chun-Cheng Wang
(74) *Attorney, Agent, or Firm* — Cantor Colburn LLP

(57) ABSTRACT

A composition, comprising, based on the total weight of the polymer components in the composition, 1 to 40 wt. % of an aromatic polycarbonate, 30 to 98.8 wt. % of a polysiloxane-polycarbonate block copolymer, and 0.1 to 10 wt. % of a polysiloxane-polyimide block copolymer comprising more than 20 wt. % polysiloxane blocks, based on the total weight of the polysiloxane-polyimide copolymer. The compositions provide articles with low haze, high luminous transmittance, and good hydro-aging properties. The articles can further be formulated to have excellent flame retardance, particularly when KSS is used.

15 Claims, 1 Drawing Sheet

OTHER PUBLICATIONS

International Standard, ISO 1133, "Plastics—Determination of the Melt Mass-Flow Rate (MFR) and the Melt Volume-Flow Rate (MVR) of Thermoplastics," pp. 1-16 (2005).

Underwriters Laboratories, UL 94, "Tests for Flammability of Plastic Materials for Parts in Devices and Appliances," pp. 1-33 (1996).

* cited by examiner

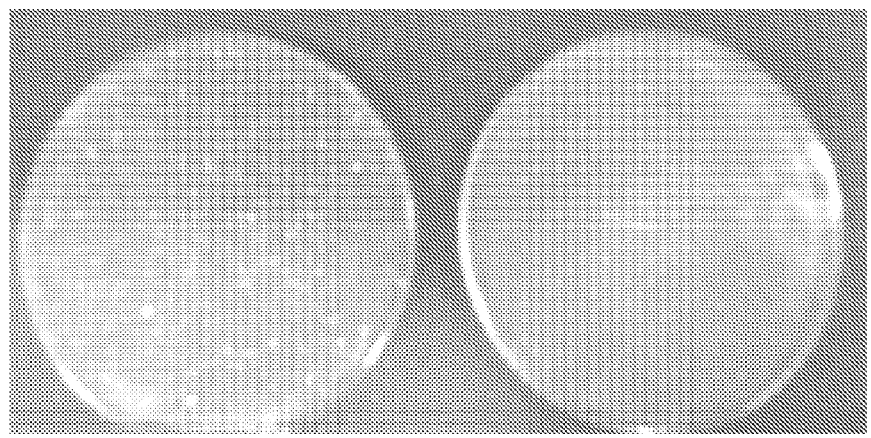
C1          E1

POLYSILOXANE-POLYCARBONATE COMPOSITIONS, METHOD OF MANUFACTURE, AND ARTICLES FORMED THEREFROM

CROSS-REFERENCES TO RELATED APPLICATIONS

This patent application claims priority to U.S. patent application Ser. No. 12/142,861 filed Jun. 20, 2008 which is hereby incorporated herein by reference in its entirety.

BACKGROUND OF THE INVENTION

This disclosure is directed to polysiloxane-polycarbonate compositions, and related methods and articles.

Polysiloxane-polycarbonates comprising aromatic carbonate units and polysiloxane carbonate units typically exhibit phase separation, as evidenced by low transparency and high degrees of haze. These optical characteristics can limit the utility and potential applications of such copolymers. There accordingly remains a need for compositions comprising polysiloxane-polycarbonates characterized by high transparency and low haze, in combination with other desirable properties such as melt flow, low temperature ductility, flame retardance (FR), and retention of mechanical properties such as impact strength after accelerated aging at elevated temperature and humidity (hydro-aging). Impact strength can be significantly degraded under such conditions within a few days.

A variety of flame retardant additives have been used in the past for obtaining low flammability at low thicknesses in various polymers. U.S. Pat. No. 4,816,527 discloses improved impact strength, enhanced physical properties and low flammability in polycarbonate and polysiloxane-polyetherimide blends. Also, US Patent Application 2007/0048527A1 discloses flame retardant polymer blends containing polycarbonate, polysiloxane-polycarbonate copolymer, and polyetherimide. However, in each of the above-mentioned prior art references, good FR performance is achieved only for opaque materials. Opaque polysiloxane-polycarbonates comprising flame retardant additives such as Rimar salt are available and have achieved a UL94 (Underwriter's Laboratory) flammability rating of V0 at thicknesses as low as 1.5 mm. Clear polysiloxane-polycarbonates, by comparison, remain a challenge with respect to achieving good flame retardance at low thicknesses, and retaining optical transparency.

Accordingly, a need exists for transparent polysiloxane-polycarbonates having good retention of mechanical properties after hydro-aging, and excellent flame retardant properties, in combination with other desirable properties such as melt flow and/or low temperature ductility.

SUMMARY OF THE INVENTION

In an embodiment, composition comprises, based on the total weight of the polymer components in the composition, 1 to 40 wt. % of an aromatic polycarbonate; 30 to 98.8 wt. % of a polysiloxane-polycarbonate block copolymer comprising carbonate units of the formula

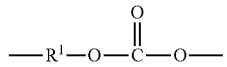

wherein at least 60 percent of the total number of $R^1$ groups are $C_{1-60}$ aromatic organic radicals and the balance thereof are aliphatic, alicyclic, or aromatic radicals, and polysiloxane units of the formula

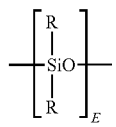

wherein each R is independently the same or different $C_{1-13}$ monovalent organic group, and E has an average value of 10 to 100; and 0.1 to 10 wt. % of a polysiloxane-polyimide block copolymer comprising more than 20 wt. % polysiloxane units, based on the total weight of the polysiloxane-polyimide copolymer; wherein a 3.2 mm thick molded sample of the composition has less than or equal to 8% haze and at least 80% luminous transmittance, measured in accordance with ASTM D1003-00, and a 3.2 mm thick molded sample retains more than 50% of its initial notched Izod impact strength of 6 to 20 ft-lb/in at 23° C. after hydro-aging for 5 days at 100° C., measured in accordance with ASTM D256:2004.

A method of manufacture of the composition comprises melt blending the components of the disclosed composition.

In another embodiment, an article comprises the disclosed composition.

In still another embodiment, a method of forming an article comprises injection molding, extrusion, injection blow molding, gas assist blow molding, or vacuum forming the disclosed composition to form the article.

In yet another embodiment, a composition comprises, based on the total weight of the composition, 10 to 20 wt. % of a bisphenol A polycarbonate; 70 to 89.9 wt. % of a polysiloxane-polycarbonate comprising bisphenol A carbonate units and polysiloxane carbonate units derived from a dihydroxy polysiloxane of the formula

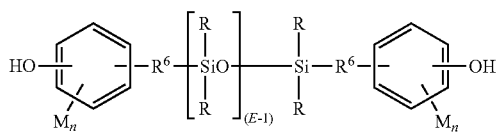

wherein R is methyl, $R^6$ is propylene, E has an average value of 20 to 50, M is methoxy, and n is 1; and 0.1 to 5 wt. % of a polysiloxane-polyetherimide block copolymer, comprising more than 20 wt. %, based on the weight of the block copolymer, of polysiloxane units in the form of blocks of the formula

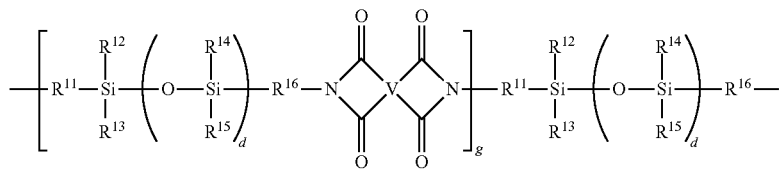

wherein each $R^{11}$ and $R^{16}$ are the same $C_{1-12}$ alkylene groups, $R^{12}$ to $R^{15}$ are each methyl groups, V is a polycyclic $C_{12-36}$ group, d is 1 to 20, and g is 2 to 20; and polyetherimide blocks comprising units of the formula

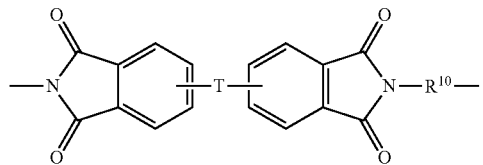

wherein $R^{10}$ is propyl, and T is

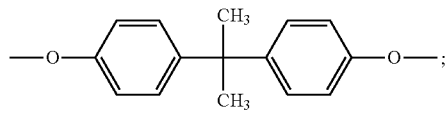

and wherein a 3.2 mm thick molded sample of the composition has a haze of less than or equal to 3% and at least 85% luminous transmittance, measured in accordance with ASTM D1003-00, and a 3.2 mm thick molded sample retains more than 50% of its initial notched Izod impact strength of 6 to 20 ft-lb/in at 23° C. after 5 days hydro-aging at 100° C., measured in accordance with ASTM D256:2004.

In still another embodiment, a composition comprises, based on the total weight of the polymer components in the composition, 1 to 40 wt. % of an aromatic polycarbonate; 30 to 98.8 wt. % of a polysiloxane-polycarbonate block copolymer comprising carbonate units of the formula

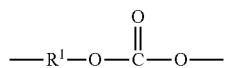

wherein at least 60 percent of the total number of $R^1$ groups are $C_{1-60}$ aromatic organic radicals and the balance thereof are aliphatic, alicyclic, or aromatic radicals, and polysiloxane units of the formula

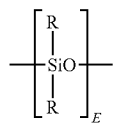

wherein R is independently the same or different $C_{1-13}$ monovalent organic group, and E has an average value of 10 to 100; 0.1 to 10 wt. % of a polysiloxane-polyimide block copolymer comprising more than 20 wt. % polysiloxane units, based on the total weight of the polysiloxane-polyimide copolymer; and 0.01 to 5 parts of an aromatic sulfonate salt based on 100 parts by weight of the total weight of the polymers in the composition; wherein a 3.2 mm thick molded sample of the composition has less than or equal to 8% haze and at least 80% luminous transmittance, measured in accordance with ASTM D1003-00, a 3.2 mm thick molded sample retains more than 50% of its initial notched Izod impact strength of 6 to 20 ft-lb/in at 23° C. after hydro-aging for 5 days at 100° C., measured in accordance with ASTM D256: 2004, and a molded sample of the composition having a thickness of 2.0 mm has a UL94 flammability rating of V0.

BRIEF DESCRIPTION OF THE DRAWING

The FIGURE is a photograph of examples C1 (left, 0 wt. % PEI-Si) and E1 (right, 2 wt. % PEI-Si) after 5 days hydro-aging.

DETAILED DESCRIPTION OF THE INVENTION

Transparent thermoplastic compositions comprising a polycarbonate, a polysiloxane-polycarbonate, and a polysiloxane-polyimide are disclosed that have good retention of impact strength after hydro-aging. In particular, it has been found that the presence of a small amount of the polysiloxane-polyimide imparts improved resistance to prolonged elevated temperatures and humidity without degrading optical properties, compared to compositions lacking the polysiloxane-polyimide. When combined with an aryl or diarylsulfonate salt, the polysiloxane-polyimide also imparts a high degree of flame retardance without degrading impact strength, optical transparency, and melt flow properties.

As used herein, a "polycarbonate" has repeating structural carbonate units of formula (1):

in which at least 60 percent of the total number of $R^1$ groups contain aromatic organic radicals and the balance thereof are aliphatic, alicyclic, or aromatic radicals. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (2):

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (3):

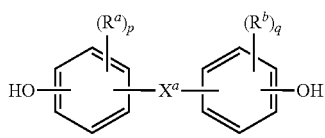

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (3), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q are each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Exemplary groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (4):

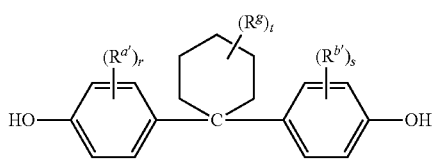

wherein $R^{a'}$ and $R^{b'}$ are each independently $C_{1-12}$ alkyl, $R^g$ is $C_{1-12}$ alkyl or halogen, r and s are each independently 1 to 4, and t is 0 to 10. In a specific embodiment, at least one of each of $R^{a'}$ and $R^{b'}$ are disposed meta to the cyclohexylidene bridging group. The substituents $R^{a'}$, $R^{b'}$, and $R^g$ can, when comprising an appropriate number of carbon atoms, be straight chain, cyclic, bicyclic, branched, saturated, or unsaturated. In an embodiment, $R^{a'}$ and $R^{b'}$ are each independently $C_{1-4}$ alkyl, $R^g$ is $C_{1-4}$ alkyl, r and s are each 1, and t is 0 to 5. In another specific embodiment, $R^{a'}$, $R^{b'}$ and $R^g$ are each methyl, r and s are each 1, and t is 0 or 3. The cyclohexylidene-bridged bisphenol can be the reaction product of two moles of o-cresol with one mole of cyclohexanone. In another exemplary embodiment, the cyclohexylidene-bridged bisphenol is the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

In another embodiment, $X^a$ is a $C_{1-18}$ alkylene group, a $C_{3-18}$ cycloalkylene group, a fused $C_{6-18}$ cycloalkylene group, or a group of the formula —$B^1$—W—$B^2$— wherein $B^1$ and $B^2$ are the same or different $C_{1-6}$ alkylene group and W is a $C_{3-12}$ cycloalkylidene group or a $C_{6-16}$ arylene group.

$X^a$ can also be a substituted $C_{3-18}$ cycloalkylidene of formula (5):

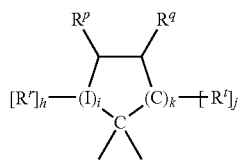

wherein $R^r$, $R^p$, $R^q$, and $R^t$ are independently hydrogen, halogen, oxygen, or $C_{1-12}$ organic groups; I is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (5) will have an unsaturated carbon-carbon linkage where the ring is fused. When k is one and i is 0, the ring as shown in formula (5) contains 4 carbon atoms, when k is 2, the ring as shown in formula (5) contains 5 carbon atoms, and when k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful aromatic dihydroxy compounds of the formula HO—$R^1$—OH include compounds of formula (6):

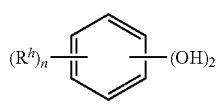

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl; 1,6-dihydroxynaphthalene, 2,6-dihydroxynaphthalene; bis (4-hydroxyphenyl)methane; bis(4-hydroxyphenyl)diphenyl-methane; bis(4-hydroxyphenyl)-1-naphthylmethane; 1,2-bis(4-hydroxyphenyl)ethane; 1,1-bis(4-hydroxyphenyl)-1-phenylethane; 2-(4-hydroxyphenyl)-2-(3-hydroxyphenyl)propane; bis(4-hydroxyphenyl)phenylmethane; 2,2-bis(4-hydroxy-3-bromophenyl)propane; 1,1-bis (hydroxyphenyl) cyclopentane; 1,1-bis(4-hydroxyphenyl)cyclohexane; 1,1-bis(4-hydroxyphenyl)isobutene; 1,1-bis(4-hydroxyphenyl)cyclododecane; trans-2,3-bis(4-hydroxyphenyl)-2-butene; 2,2-bis(4-hydroxyphenyl)adamantane; alpha, alpha'-bis(4-hydroxyphenyl)toluene; bis(4-hydroxyphenyl)acetonitrile; 2,2-bis(3-methyl-4-hydroxyphenyl)propane; 2,2-bis(3-ethyl-4-hydroxyphenyl)propane; 2,2-bis(3-n-propyl-4-hydroxyphenyl)propane; 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl)propane; 2,2-bis(3-methoxy-4-hydroxyphenyl)propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,4'-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(4-hydroxyphenyl)sulfide; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane ("spirobiindane bisphenol"); 3,3-bis(4-hydroxyphenyl)phthalimide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene; 2,7-dihydroxycarbazole; resorcinol; substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing dihydroxy compounds.

Specific examples of bisphenol compounds of formula (3) include 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; 2,2-bis(4-hydroxy-3-methylphenyl)propane; 1,1-bis(4-hydroxy-t-butylphenyl)propane; 3,3-bis(4-hydroxyphenyl) phthalimidine; 2-phenyl-3,3-bis(4-hydroxyphenyl) phthalimidine (PPPBP); 1,1-bis(4-hydroxy-3-methylphenyl) cyclohexane (DMBPC); and combinations comprising at least one of the foregoing dihydroxy compounds. In one specific embodiment, the polycarbonate is a linear homopolymer derived from bisphenol A, in which each of $A^1$ and $A^2$ is p-phenylene and $Y^1$ is isopropylidene in formula (3).

The polycarbonates can have an intrinsic viscosity, as determined in chloroform at 25° C., of about 0.3 to about 1.5 deciliters per gram (dl/gm), specifically about 0.45 to about 1.0 dl/gm. The polycarbonates can have a weight average molecular weight of about 10,000 to about 200,000 Daltons, specifically about 20,000 to about 100,000 Daltons, as measured by gel permeation chromatography (GPC), using a crosslinked styrene-divinylbenzene column and calibrated to polycarbonate references. GPC samples are prepared at a concentration of about 1 mg/ml, and are eluted at a flow rate of about 1.5 ml/min In one embodiment, the polycarbonate has flow properties useful for the manufacture of thin articles. Melt volume flow rate (often abbreviated MVR) measures the rate of extrusion of a thermoplastics through an orifice at a prescribed temperature and load. Polycarbonates useful for the formation of thin articles can have an MVR, measured at 300° C./1.2 kg, of about 3 to about 35 cubic centimeters per 10 minutes (cc/10 min, or ml/10 min), specifically about 5 to about 30 cc/10 min. Combinations of polycarbonates of different flow properties can be used to achieve the overall desired flow property.

"Polycarbonates" as used herein includes homopolycarbonates, (wherein each $R^1$ in the polymer is the same), copolymers comprising different $R^1$ moieties in the carbonate (referred to herein as "copolycarbonates"), copolymers comprising carbonate units and other types of polymer units, such as ester units, and combinations comprising at least one of homopolycarbonates and/or copolycarbonates. As used herein, a "combination" is inclusive of blends, mixtures, alloys, reaction products, and the like.

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., about 8 to about 12. The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_2(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be about 0.1 to about 10 weight percent (wt. %) based on the weight of bisphenol in the phosgenation mixture. In another embodiment an effective amount of phase transfer catalyst can be about 0.5 to about 2 wt. % based on the weight of bisphenol in the phosgenation mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxyphenylethane, isatin-bisphenol, trisphenol TC (1,3,5-tris((p-hydroxyphenyl)isopropyl)benzene), trisphenol PA (4(4(1,1-bis(p-hydroxyphenyl)-ethyl)alpha, alpha-dimethyl benzyl)phenol), 4-chloroformyl phthalic anhydride, trimesic acid, and benzophenone tetracarboxylic acid. The branching agents can be added at a level of about 0.05 to about 2.0 wt. % of the reactive components. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are useful. Functionalized chlorides of aliphatic monocarboxylic acids, such as acryloyl chloride and methacryloyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a BANBURY® mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing esters. In addition, useful transesterification catalysts can include phase transfer catalysts of formula $(R^3)_4Q^+X$, wherein each $R^3$, Q, and X are as defined above. Exemplary transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing.

The composition further comprises a polysiloxane-polycarbonate copolymer, comprising aromatic carbonate units of formula (1) as described above and polysiloxane carbonate units comprising polysiloxane (also referred to as polydiorganosiloxane) blocks of formula (7):

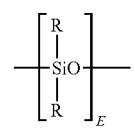

(7)

wherein each R is independently the same or different $C_{1-13}$ monovalent organic group. For example, R can be a $C_1$-$C_{13}$ alkyl, $C_1$-$C_{13}$ alkoxy, $C_2$-$C_{13}$ alkenyl group, $C_2$-$C_{13}$ alkenyloxy, $C_3$-$C_6$ cycloalkyl, $C_3$-$C_6$ cycloalkoxy, $C_6$-$C_{14}$ aryl, $C_6$-$C_{10}$ aryloxy, $C_7$-$C_{13}$ arylalkyl, $C_7$-$C_{13}$ aralkoxy, $C_7$-$C_{13}$ alkylaryl, or $C_7$-$C_{13}$ alkylaryloxy. The foregoing groups can be fully or partially halogenated with fluorine, chlorine, bromine, or iodine, or a combination thereof. In an embodiment, where a transparent polysiloxane-polycarbonate is desired, R is unsubstituted by halogen. Combinations of the foregoing R groups can be used in the same copolymer.

The value of E in formula (7) can vary widely depending on the type and relative amount of each component in the thermoplastic composition, the desired properties of the composition, and like considerations. Generally, E has an average value of 2 to about 1,000, specifically about 2 to about 500, more specifically about 5 to about 100, and even more specifically 10 to 100. In one embodiment, E has an average value of about 10 to about 75, and in still another embodiment, E has an average value of about 20 to 40, or alternatively, 40 to 60. Where E is of a lower value, e.g., less than about 40, it can be desirable to use a relatively larger amount of the polysiloxane-polycarbonate copolymer. Conversely, where E is of a higher value, e.g., greater than about 40, a relatively lower amount of the polysiloxane-polycarbonate copolymer can be used.

A combination of a first and a second (or more) polysiloxane-polycarbonate copolymers can be used, wherein the average value of E of the first copolymer is less than the average value of E of the second copolymer.

In one embodiment, the polysiloxane blocks are of the formula (8):

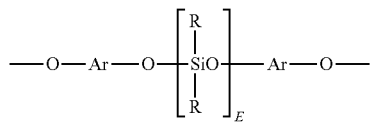

(8)

wherein E is as defined above; each R can be the same or different, and is as defined above; and Ar can be the same or different, and is a substituted or unsubstituted $C_6$-$C_{30}$ arylene group, wherein the bonds are directly connected to an aromatic moiety. Ar groups in formula (8) can be derived from a $C_6$-$C_{30}$ dihydroxyarylene compound, for example a dihydroxyarylene compound of formula (3) or (6) above. Exemplary dihydroxyarylene compounds are 1,1-bis(4-hydroxyphenyl) methane; 1,1-bis(4-hydroxyphenyl)ethane; 2,2-bis(4-hydroxyphenyl)propane; 2,2-bis(4-hydroxyphenyl) butane; 2,2-bis(4-hydroxyphenyl)octane; 1,1-bis(4-hydroxyphenyl)propane; 1,1-bis(4-hydroxyphenyl)n-butane; 2,2-bis(4-hydroxy-1-methylphenyl)propane; 1,1-bis(4-hydroxyphenyl)cyclohexane; bis(4-hydroxyphenyl sulfide); and 1,1-bis(4-hydroxy-t-butylphenyl)propane. Combinations comprising at least one of the foregoing dihydroxy compounds can also be used.

In another embodiment, the polysiloxane blocks are of formula (9):

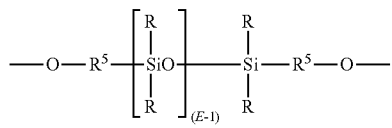

(9)

wherein R and E are as described above, and each $R^5$ is independently a divalent $C_1$-$C_{30}$ organic group. In a specific embodiment, the polysiloxane blocks are of formula (10):

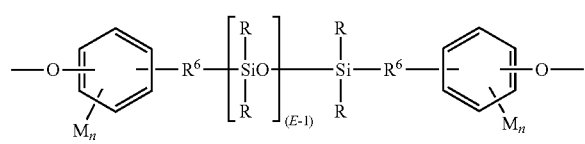

(10)

wherein R and E are as defined above; $R^6$ is a divalent $C_2$-$C_8$ aliphatic group; and each M is the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, n is 1 or 2, M is bromo or chloro, an alkyl group such as methyl, ethyl, or propyl, an alkoxy group such as methoxy, ethoxy, or propoxy, or an aryl group such as phenyl, chlorophenyl, or tolyl; $R^6$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, n is 1, M is methoxy, $R^6$ is a divalent $C_1$-$C_3$ aliphatic group, and R is methyl.

Blocks of formula (10) can be derived from the corresponding dihydroxy polysiloxane (11):

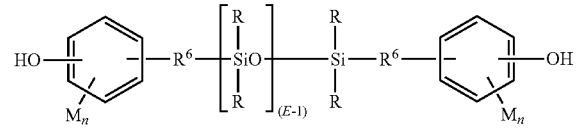

(11)

wherein R, E, M, $R^6$, and n are as described above. Such dihydroxy polysiloxanes can be made by effecting a platinum-catalyzed addition between a polysiloxane hydride of formula (12):

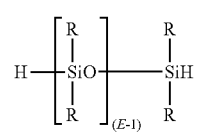

(12)

wherein R and E are as previously defined, and an aliphatically unsaturated monohydric phenol. Exemplary aliphatically unsaturated monohydric phenols include eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Combinations comprising at least one of the foregoing can also be used.

In one embodiment, the aromatic carbonate units of the polysiloxane-polycarbonate are derived from a dihydroxy compound of the formula (2):

$$HO-A^1-Y^1-A^2-OH \qquad (2)$$

wherein each of $A^1$ and $A^2$ is a monocyclic divalent aryl radical and $Y^1$ is a bridging radical having one or two atoms that separates $A^1$ from $A^2$; and siloxane blocks are of formula (9) wherein n is 1 or 2, M is bromo, chloro, methyl, ethyl, propyl, methoxy, ethoxy, propoxy, phenyl, chlorophenyl, or tolyl, $R^6$ is a dimethylene, trimethylene or tetramethylene group, and R is a $C_{1-8}$ alkyl, trifluoropropyl, cyanoalkyl, phenyl, chlorophenyl or tolyl. In a specific embodiment, $Y^1$ of the aromatic carbonate blocks is —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, or adamantylidene; and n is 1, M is methyl, ethyl, methoxy, or ethoxy, $R^6$ is a dimethylene, trimethylene or tetramethylene group, and R is a methyl, trifluoromethyl or phenyl. Even more specifically, $A^1$ and $A^2$ are each para-phenylene and $Y^1$ is isopropylidene; and n is 1, M is methoxy, $R^6$ is a trimethylene or tetramethylene group, and each R is a methyl or trifluoropropyl group.

The polysiloxane-polycarbonate can comprise 50 to 99 wt. % of aromatic carbonate units and 1 to 50 wt. % polysiloxane carbonate units. Within this range, the polysiloxane-polycarbonate copolymer can comprise 70 to 98 wt. %, more specifically 75 to 97 wt. % of aromatic carbonate units and 2 to 30 wt. %, more specifically 3 to 25 wt. % polysiloxane carbonate units.

Polysiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C./1.2 kg, of 1 to 50 cubic centimeters per 10 minutes (cc/10 min), specifically 2 to 30 cc/10 min Mixtures of polysiloxane-polycarbonates of different flow properties can be used to achieve the overall desired flow property.

The composition further comprises a polysiloxane-polyimide block copolymer comprising polysiloxane blocks and polyimide blocks. The polysiloxane blocks and polyimide blocks can be randomly arranged or alternating in the polysiloxane-polyimide block copolymer.

In the polysiloxane-polyimide block copolymer, the polysiloxane block content is greater than or equal to 20 wt. %, based on the total weight of the polysiloxane-polyimide block copolymer. The polysiloxane blocks are of formula (13):

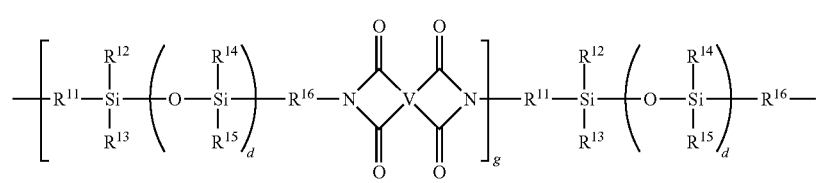

(13)

wherein each $R^{11}$ and $R^{16}$ is divalent, and is independently a substituted or unsubstituted, saturated, unsaturated, or aromatic monocyclic group having 5 to 30 carbon atoms, a substituted or unsubstituted, saturated, unsaturated, or aromatic polycyclic group having 5 to 30 carbon atoms, a substituted or unsubstituted alkyl group having 1 to 30 carbon atoms, or a substituted or unsubstituted alkenyl group having 2 to 30 carbon atoms; each $R^{12}$ to le is monovalent, and is independently a substituted or unsubstituted, saturated, unsaturated, or aromatic monocyclic group having 5 to 30 carbon atoms, a substituted or unsubstituted, saturated, unsaturated, or aromatic polycyclic group having 5 to 30 carbon atoms, a substituted or unsubstituted alkyl group having 1 to 30 carbon atoms, or a substituted or unsubstituted alkenyl group having 2 to 30 carbon atoms; V is a tetravalent linker and is a substituted or unsubstituted, saturated, unsaturated, or aromatic monocyclic or polycyclic group having 5 to 50 carbon atoms, a substituted or unsubstituted alkyl group having 1 to 30 carbon atoms, a substituted or unsubstituted alkenyl group having 2 to 30 carbon atoms; g is 1 to 30; and d is 2 to 20. Exemplary substitutions in the foregoing groups include, but are not limited to, carbocyclic groups, aryl groups, ethers, sulfones, sulfides amides, esters, and combinations comprising at least one of the foregoing.

In one embodiment $R^{12}$ to $R^{15}$ are each methyl groups and each $R^{11}$ and $R^{16}$ are the same $C_{1-12}$ alkylene groups, and V is an aromatic polycyclic group having 12 to 36 carbon atoms. Exemplary linkers V include, but are not limited to, tetravalent aromatic radicals of formulas (14a) to (14d):

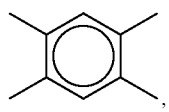

(14a)

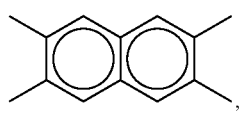

(14b)

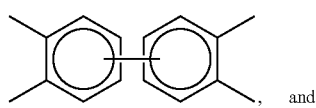

, and (14c)

-continued

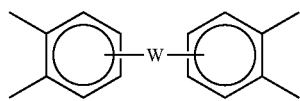

(14d)

wherein W is a divalent moiety such as —O—, —S—, —C(O)—, —SO$_2$—, —SO—, —C$_y$H$_{2y}$— and halogenated derivatives thereof, including perfluoroalkylene groups, wherein y is an integer of 1 to 20, or a group of the formula —O—Z—O—; wherein the divalent bonds of the —O— or the —O—Z—O— group are in the 3,3', 3,4', 4,3', or the 4,4' positions, and wherein Z includes, but is not limited to, divalent moieties of formulas (15a) to (15i):

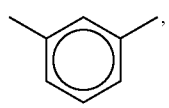

(15a)

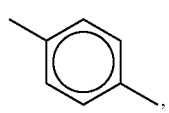

(15b)

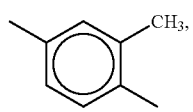

(15c)

-continued

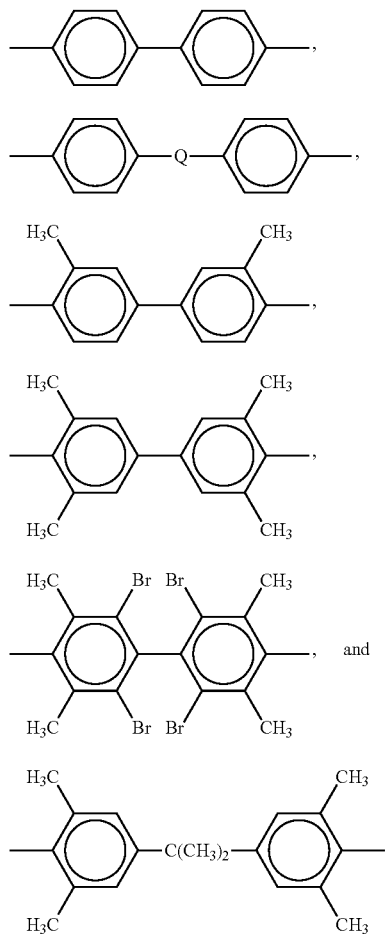

wherein Q is —O—, —S—, —C(O)—, —SO$_2$—, —SO—, —C$_y$H$_{2y}$—, and halogenated derivatives thereof including perfluoroalkylene groups, wherein y is an integer from 1 to 20. In some embodiments the tetravalent linker V is free of halogens.

In a specific embodiment, R$^{12}$ to R$^{15}$ are each methyl groups, each R$^{11}$ and R$^{16}$ are the same C$_{1-6}$ alkylene groups, and tetravalent linker V is of formula 14(d) wherein W is a group of the formula —O—Z—O—; wherein the divalent bonds of the —O— or the —O—Z—O— group are in the 3,3', 3,4', 4,3', or the 4,4' positions, and Z is of formula (15e) wherein Q is isopropylidene.

As can be seen from formula (13), the polysiloxane blocks comprise two or more polysiloxane chains linked together by imide groups. The polysiloxane blocks can be manufactured by reacting a diamino polysiloxane and a dianhydride to form a polysiloxane oligomer that can be used to form the polysiloxane-polyimide block copolymer. Either the diamino polysiloxane or the dianhydride is present in 10 to 50% molar excess, or, more specifically, 10 to 25% molar excess. "Molar excess" as used in this context is defined as being in excess of the other reactant. For example, if the diamino polysiloxane is present in 10% molar excess then for 100 moles of dianhydride there are 110 moles of diamino polysiloxane.

Diamino polysiloxanes useful for forming the polysiloxane oligomer have formula (16):

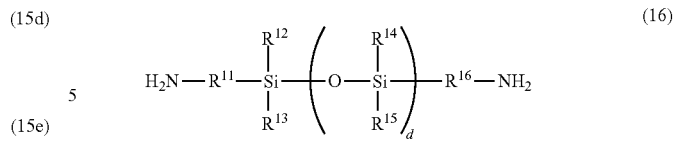

wherein R$^{11}$ to R$^{16}$ and g are defined as above. In one embodiment R$^{12}$ to R$^{15}$ are each methyl groups and each R$^{11}$ and R$^{16}$ are the same C$_{1-20}$ alkylene groups. The synthesis of diamino polysiloxanes is known in the art and is taught, for example, in U.S. Pat. Nos. 3,185,719 and 4,808,686. In one embodiment R$^{11}$ and R$^{16}$ are the same C$_{3-10}$ alkylene groups.

Dianhydrides useful for forming the polysiloxane oligomer have formula (17):

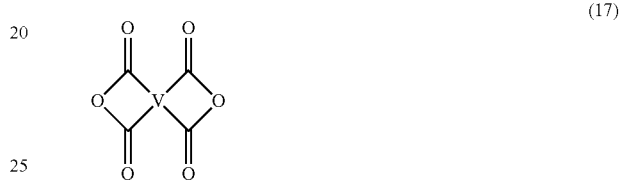

wherein V is a tetravalent linker as described above. In one embodiment, the dianhydride is an aromatic bis(ether anhydride). Illustrative examples of aromatic bis(ether anhydride)s include 2,2-bis[4-(3,4-dicarboxyphenoxy)phenyl] propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 4-(2,3-dicarboxyphenoxy)-4'-(3,4-dicarboxyphenoxy)diphenyl sulfone dianhydride; and mixtures comprising at least two of the foregoing dianhydrides.

A chemical equivalent to a dianhydride can also be used. Examples of dianhydride chemical equivalents include tetrafunctional carboxylic acids capable of forming a dianhydride and ester or partial ester derivatives of the tetra functional carboxylic acids. Mixed anhydride acids or anhydride esters can also be used as an equivalent to the dianhydride. As used throughout the specification and claims "dianhydride" will refer to dianhydrides and their chemical equivalents.

The diamino polysiloxane and dianhydride can be reacted in a suitable solvent, such as a halogenated aromatic solvent, for example orthodichlorobenzene, optionally in the presence of a polymerization catalyst such as an alkali metal aryl phosphinate or alkali metal aryl phosphonate, for example, sodium phenylphosphonate. In some instances the solvent will be an aprotic polar solvent with a molecular weight less than or equal to 500 to facilitate removal of the solvent from the polymer. The temperature of the reaction can be greater than or equal to 100° C. and the reaction can run under azeotropic conditions to remove the water formed by the reaction. In some embodiments the polysiloxane-polyimide block copolymer has a residual solvent content less than or equal to 500 parts by weight of solvent per million parts by weight of polymer (ppm), or, more specifically, less than or equal to 250 ppm, or, even more specifically, less than or equal to 100 ppm. Residual solvent content can be determined by a number of methods including, for example, gas chromatography.

The stoichiometric ratio of the diamino polysiloxane and dianhydride in the reaction to form the product polysiloxane oligomer determines the degree of chain extension, (d in formula (13)+1) in the extended polysiloxane oligomer. For example, a stoichiometric ratio of 4 moles diamino polysiloxane to 6 moles dianhydride will yield a polysiloxane oligomer with a value for d+1 of 4. As understood by one of ordinary skill in the art, d+1 is an average value for the polysiloxane containing portion of the block copolymer and the value for d+1 is generally rounded to the nearest whole number. For example a value for d+1 of 4 includes values of 3.5 up to but not including 4.5

In some embodiments d is less than or equal to 50, or, more specifically, less than or equal to 25, or, even more specifically, less than or equal to 10.

The extended polysiloxane oligomers are further reacted with non-polysiloxane diamines and additional dianhydrides to make the polysiloxane-polyimide block copolymer. The overall molar ratio of the total amount of dianhydride and diamine (the total of both the polysiloxane and non-polysiloxane containing diamines) used to make the polysiloxane-polyimide block copolymer should be about equal so that the copolymer can polymerize to a high molecular weight. In some embodiments the ratio of total diamine to total dianhydride is 0.9 to 1.1, or, more specifically 0.95 to 1.05. In some embodiments the polysiloxane-polyimide block copolymer will have a number average molecular weight (Mn) of 5,000 to 50,000 Daltons, or, more specifically, 10,000 to 30,000 Daltons, using polystyrene standards. The additional dianhydride can be the same or different from the dianhydride used to form the extended polysiloxane oligomer.

The non-siloxane polyimide block in the polysiloxane-polyimide block copolymer is of formula (18):

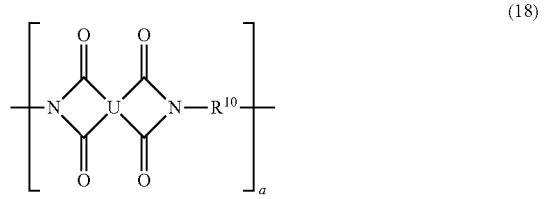

(18)

wherein a is more than 1, typically 10 to 1,000 or more, specifically 10 to 500; each $R^{10}$ is independently a substituted or unsubstituted, saturated, unsaturated, or aromatic monocyclic group having 5 to 30 carbon atoms, a substituted or unsubstituted, saturated, unsaturated, or aromatic polycyclic group having 5 to 30 carbon atoms, a substituted or unsubstituted alkyl group having 1 to 30 carbon atoms, or a substituted or unsubstituted alkenyl group having 2 to 30 carbon atoms; and U is a tetravalent linker and is a substituted or unsubstituted, saturated, unsaturated, or aromatic monocyclic or polycyclic group having 5 to 50 carbon atoms, a substituted or unsubstituted alkyl group having 1 to 30 carbon atoms, a substituted or unsubstituted alkenyl group having 2 to 30 carbon atoms. Exemplary substitutions in the foregoing groups include, but are not limited to, carbocyclic groups, aryl groups, ethers, sulfones, sulfides amides, esters, and combinations comprising at least one of the foregoing.

In a specific embodiment, $R^{10}$ is a divalent aromatic hydrocarbon group having 6 to 20 carbons or a halogenated derivative thereof; a straight or branched chain alkylene group having 2 to 20 carbons; a cycloalkylene group having 3 to 20 carbon atoms; or a divalent group of the formula (19):

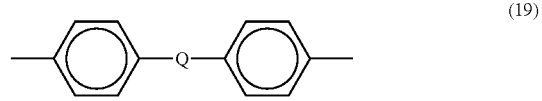

(19)

wherein Q is defined as above.

Exemplary tetravalent linkers include the tetravalent aromatic radicals of formula (14a) to (14d). In some embodiments V in the polysiloxane block and U in the polyimide block are the same. In some embodiments V and U are different.

More particularly, the polyimide block can be a polyetherimide block comprising repeating units of formula (20):

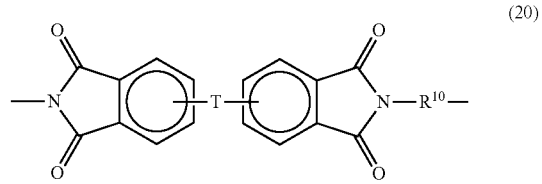

(20)

wherein T is —O— or a group of the formula —O—Z—O— wherein the divalent bonds of the —O— or the —O—Z—O— group are in the 3,3', 3,4', 4,3', or the 4,4' positions, and wherein Z is as described for formula (14a) to (14d) and $R^{10}$ is as described above for formula (18). In some embodiments T is free of halogens. In some embodiments the tetravalent linker U is free of halogens. In a specific embodiment, $R^{10}$ is a divalent aromatic hydrocarbon group having 6 to 20 carbons or a halogenated derivative thereof; a straight or branched chain alkylene group having 2 to 20 carbons; a cycloalkylene group having 3 to 20 carbon atoms; or a divalent group of the formula (19).

In one embodiment the polyetherimide block comprises structural units of formula (20) wherein each $R^{10}$ is independently derived from p-phenylene, m-phenylene, diamino aryl sulfone or a mixture thereof and T is a divalent moiety of formula (21):

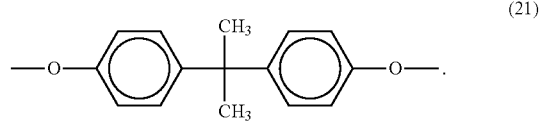

(21)

The repeating units of the polyimide block of formula (18) and polyetherimide block of formula (20) are derived from polyimide oligomers and polyetherimide oligomers formed by the reaction of a dianhydride and a diamine. Dianhydrides useful for forming the repeating units have the formula (22):

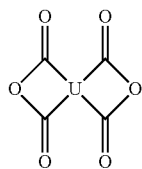
(22)

wherein U is as defined above. As mentioned above the term dianhydrides includes chemical equivalents of dianhydrides.

In one embodiment, the dianhydride is an aromatic bis (ether anhydride). Illustrative examples of aromatic bis(ether anhydride)s include: 2,2-bis[4-(3,4-dicarboxyphenoxy)phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; 4-(2,3-dicarboxyphenoxy)-4'-(3,4-dicarboxyphenoxy)diphenyl sulfone dianhydride; and mixtures comprising at least two of the foregoing.

Diamines useful for forming the repeating units of formulas (18) and (20) have the formula (23):

(23)

wherein $R^{10}$ is as defined above. Exemplary diamines include ethylenediamine; propylenediamine; trimethylenediamine; diethylenetriamine; triethylenetetraamine; hexamethylenediamine; heptamethylenediamine; octamethylenediamine; nonamethylenediamine; decamethylenediamine; 1,12-dodecanediamine; 1,18-octadecanediamine; 3-methylheptamethylenediamine; 4,4-dimethylheptamethylenediamine; 4-methylnonamethylenediamine; 5-methylnonamethylenediamine; 2,5-dimethylhexamethylenediamine; 2,5-dimethylheptamethylenediamine; 2,2-dimethylpropylenediamine; N-methyl-bis (3-aminopropyl) amine; 3-methoxyhexamethylenediamine; 1,2-bis(3-aminopropoxy)ethane; bis(3-aminopropyl)sulfide; 1,4-cyclohexanediamine; bis-(4-aminocyclohexyl)methane; m-phenylenediamine; p-phenylenediamine; 2,4-diaminotoluene; 2,6-diaminotoluene; m-xylylenediamine; p-xylylenediamine; 2-methyl-4,6-diethyl-1,3-phenylene-diamine; 5-methyl-4,6-diethyl-1,3-phenylene-diamine; benzidine; 3,3'-dimethylbenzidine; 3,3'-dimethoxybenzidine; 1,5-diaminonaphthalene; bis(4-aminophenyl)methane; bis(2-chloro-4-amino-3,5-diethylphenyl)methane; bis(4-aminophenyl)propane; 2,4-bis(p-amino-t-butyl)toluene; bis (p-amino-t-butylphenyl)ether; bis(p-methyl-o-aminophenyl) benzene; bis(p-methyl-o-aminopentyl)benzene; 1,3-diamino-4-isopropylbenzene; bis(4-aminophenyl)sulfide; bis (4-aminophenyl)sulfone; bis(4-aminophenyl)ether; 1,3-bis(3-aminopropyl)tetramethyldisiloxane; and mixtures of the foregoing compounds. In one embodiment the diamine is an aromatic diamine, or, more specifically, m-phenylenediamine, p-phenylenediamine, sulfonyl dianiline, or mixtures thereof.

In general, the reactions can be carried out using various solvents, e.g., o-dichlorobenzene, m-cresol/toluene, and the like, to effect a reaction between the dianhydride of formula (22) and the diamine of formula (23), at temperatures of 100 to 250° C. Alternatively, the polyimide oligomers or polyetherimide oligomers can be prepared by melt polymerization or interfacial polymerization, e.g., melt polymerization of an aromatic bis(ether anhydride) and a diamine by heating a mixture of the starting materials to elevated temperatures with concurrent stirring. Generally, melt polymerizations employ temperatures of 200 to 400° C.

The polysiloxane-polyimide or polysiloxane-polyetherimide block copolymer can be made by first forming the extended polysiloxane oligomer and then further reacting the extended polysiloxane oligomer with a non-siloxane diamine and dianhydride. Alternatively, a non-siloxane diamine and dianhydride can be reacted to form a polyimide oligomer or a polyetherimide oligomer. The polyimide or polyetherimide oligomer and extended polysiloxane oligomer can then be reacted to form the polysiloxane-polyimide or polysiloxane-polyetherimide block copolymer. A chain terminating agent can be used to control the molecular weight of the polysiloxane-polyimide or polysiloxane-polyetherimide block copolymer. Mono-functional amines such as aniline, or mono-functional anhydrides such as phthalic anhydride can be employed.

When using a polyimide or polyetherimide oligomer and an extended polysiloxane oligomer to form the block copolymer, the stoichiometric ratio of terminal anhydride functionalities to terminal amine functionalities is 0.90 to 1.10, or, more specifically, 0.95 to 1.05. In one embodiment the extended polysiloxane oligomer is amine terminated and the non-polysiloxane polyimide or polyetherimide oligomer is anhydride terminated. In another embodiment, the extended polysiloxane oligomer is anhydride terminated and the non-polysiloxane polyimide oligomer is amine terminated. In another embodiment, the extended polysiloxane oligomer and the non-polysiloxane polyimide or polyetherimide oligomer are both amine terminated and they are both reacted with a sufficient amount of dianhydride (as described above) to provide a copolymer of the desired molecular weight. In another embodiment, the extended polysiloxane oligomer and the non-polysiloxane polyimide oligomer are both anhydride terminated and they are both reacted with a sufficient amount of diamine (as described above) to provide a block copolymer of the desired molecular weight. Reaction conditions for the polymerization of the extended polysiloxane oligomer and polyimide or polyetherimide oligomers are similar to those required for the formation of the oligomers themselves and can be determined without undue experimentation by one of ordinary skill in the art.

In some embodiments two or more polysiloxane-polyimide or polysiloxane-polyetherimide block copolymers can be combined to achieve the desired polysiloxane content for use in the blend. The block copolymers can be used in any proportion. For example, when two block copolymers are used the weight ratio of the first block copolymer to the second block copolymer can be 1 to 99 to 99 to 1.

In one embodiment the composition further comprises an aromatic sulfonate salt. The aromatic sulfonate salt is a monoaryl sulfonate salt of formula (24):

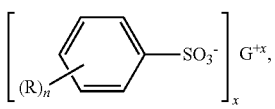

(24)

a diaryl sulfonate salt of formula (25):

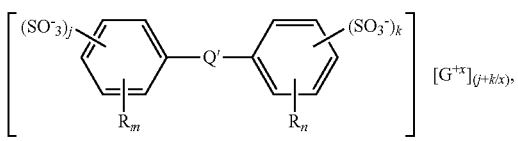

(25)

or a combination comprising at least one of the foregoing salts. Each R is independently a $C_1$-$C_{10}$ alkyl or alkyl ether group, a $C_6$-$C_{10}$ alkylaryl, arylalkyl, or arylether group, or a halogen; Q' is a divalent linking group; G is an alkali metal or alkaline earth metal; x is 1 or 2, the oxidation state of G; and j, k, m and n are each integers from 0 to 5, subject to the limitation that j+k is at least 1 and subject to the further limitation that j+m is less than or equal to 5 and k+n is less than or equal to 5. In a specific embodiment, j is zero and k is one, and more specifically R is a $C_1$-$C_6$ alkyl group, more specifically a $C_1$-$C_4$ alkyl group, even more specifically a $C_1$-$C_2$ alkyl group. The divalent linking group Q' can be an —$SO_2$— or —O— group. Specific metals are selected from the group consisting of periodic table Group IA metals, still more specifically sodium and potassium. Specific exemplary aromatic sulfonate salts include alkaline and alkaline earth metal salts of benzene sulfonate, toluene sulfonate, dichlorophenyl benzene sulfonate, diphenyl sulfone sulfonate, and the like, in particular sodium toluene sulfonate, sodium benzene sulfonate, sodium dichlorophenyl benzene sulfonate, and potassium diphenyl sulfone sulfonate (KSS).

The aromatic sulfonate salt can be present in the composition in an amount from 0.01 to 0.5 wt. %, specifically 0.1 to 0.5 wt. %, more specifically 0.1 to 0.3 wt. %, each based on the total weight of the composition. More specifically, the composition comprises only one sulfonate salt, potassium diphenyl sulfone sulfonate (KSS).

The thermoplastic composition can also include various additives ordinarily incorporated in resin compositions of this type, with the proviso that the additives are selected so as to not significantly adversely affect the desired properties of the thermoplastic composition, for example, luminous transmittance, haze, heat aging properties, and/or flame retardancy. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, additional flame retardants, anti-drip agents, and radiation stabilizers. Combinations of additives can be used, for example an anti-oxidant, a UV absorber, and a mold release agent. The total amount of additives (other than any impact modifier, filler, or reinforcing agents) is generally 0.01 to 5 wt. %, based on the total weight of the composition.

To prepare the composition, the components can be mixed by any known methods. Typically, there are two distinct mixing steps: a premixing step and a melt mixing ("melt blending") step. In the premixing step, the dry ingredients are mixed together. The premixing step is typically performed using a tumbler mixer or ribbon blender. However, if desired, the premix can be manufactured using a high shear mixer such as a Henschel™ mixer or similar high intensity device. The premixing step is typically followed by a melt mixing step in which the premix is melted and mixed again as a melt. Alternatively, the premixing step can be omitted, and raw materials can be added directly into the feed section of a melt mixing device, preferably via multiple feeding systems. In the melt mixing step, the ingredients are typically melt kneaded in a single screw or twin screw extruder, a BANBURY® mixer, a two roll mill, or similar device. The examples are extruded using a twin screw type extruder, where the mean residence time of the material is from 20 to 30 seconds, and where the temperature of the different extruder zones is from 230 to 290° C. In one embodiment a method of manufacture comprises melt blending the components of the composition.

The compositions comprise 1 to 40 wt. % of polycarbonate, more specifically 5 to 35 wt. %, and most specifically 10 to 30 wt. % of polycarbonate, based on total weight of the polymer components in the composition.

The compositions further comprise 30 to 98.8 wt. % of polysiloxane-polycarbonate, more specifically 65 to 92 wt. %, and most specifically 70 to 89.9 wt. % of polysiloxane-polycarbonate, based on total weight of the polymer components in the composition.

The compositions further comprise 0.1 to 10 wt. % polysiloxane-polyimide block copolymer, more specifically 0.5 to 7 wt. %, and most specifically 1 to 5 wt. % based on total weight of the polymer components in the composition. The polysiloxane-polyimide comprises more than 20 wt. % polysiloxane blocks, more specifically from 30 to 45 wt. % polysiloxane blocks, and more specifically 35 to 40 wt. % polysiloxane blocks. The polysiloxane content in the polysiloxane-polyimide or polysiloxane-polyetherimide block copolymer is determined by the amount of extended polysiloxane oligomer used during polymerization. The polysiloxane content is calculated using the molecular weight of the diamino siloxane used to form the extended polysiloxane oligomer.

The compositions can optionally further comprise 0.01 to 5 parts aromatic sulfonate salt per 100 parts by weight of the polymer components, more specifically 0.1 to 5 parts aromatic sulfonate salt per 100 parts by weight of the polymer components, and even more specifically 0.1 to 2 parts by weight per 100 parts by weight of the polymer components.

The combination of the polycarbonate, the polysiloxane-polycarbonate block copolymer, and the polysiloxane-polyimide provides the benefits of high transparency, improved impact performance (particularly with aging), melt flow, low temperature ductility, hydrolytic stability, and certain specific chemical resistances. Addition of an aromatic sulfonate salt provides greatly improved flame retardance and hydro-aging stability, without significantly altering transparency, haze, and melt flow properties.

In a specific embodiment, it has been found that use of a polycarbonate having a weight average molecular weight (Mw) of less than 19,000 Daltons (19 KiloDaltons, or KDa) and the polysiloxane-polycarbonate block copolymer provides blends that have high flow at lower temperatures, without significantly adversely affecting the other desirable properties of the compositions, such as impact, ductility, transparency, and/or hydrolytic stability. The polycarbonates can also have an Mw of 15 to 19 KDa, specifically 17 to 18 KDa. The polysiloxane-polycarbonate block copolymer can also have an Mw of 18 to 25 KDa. All of the molecular weights are determined using a polycarbonate standard.

In one embodiment, use of a polycarbonate having an Mw of less than 19 KDa and the polysiloxane-polycarbonate block copolymer provides a composition that imparts equivalent transparency and impact resistance, and a melt flow increase of 60 to 80%, as compared to the same composition containing polycarbonates having higher molecular weights instead of the polycarbonate having molecular weight less than 19 KDa, when measured at 265° C., using a 2.16 Kg weight, measured in accordance with ISO 1133.

In one embodiment, the polycarbonate comprises a first polycarbonate derived from bisphenol A having a melt flow rate of less than 3 g/10 min, determined in accordance with ASTM D1238:2004, and a second polycarbonate derived from bisphenol A having a melt flow rate greater than 20 g/10 min in accordance with ASTM D1238:2004.

The combination of the polycarbonate, polysiloxane-polycarbonate, polysiloxane-polyimide, and aromatic sulfonate salt provides the benefits of excellent transparency and flame retardance. It is surprising that use of low quantities of the combination of the polysiloxane-polyimide, particularly polysiloxane-polyetherimide, and aromatic sulfonate salt provide greatly improved flame retardance and hydro-aging stability, without significantly altering transparency, haze, and melt flow properties. In addition, long term impact performance, low temperature ductility, and specific chemical resistances are good.

A method of forming the article comprises injection molding, extrusion, injection blow molding, gas assist blow molding, or vacuum forming the composition to form the article. In one embodiment, the article is an extruded or injection molded article.

Articles molded from the composition are flame retardant. Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, 5VA, and/or 5VB. To achieve a rating of V0, the average period of flaming and/or smoldering after removing the igniting flame does not exceed five seconds for a sample placed so that its long axis is 180 degrees to the flame, and none of the vertically placed samples produces drips of burning particles that ignite absorbent cotton place beneath the sample. In one embodiment, a molded sample comprising the thermoplastic composition attains a UL94 rating of V0 for a thickness of 2.0 mm, more specifically 1.8 mm, even more specifically 1.6 mm, and most specifically 1.5 mm, when tested in accordance with the foregoing Underwriter's Laboratory Bulletin 94, using five bars.

Flame retardance can also be analyzed by calculation of the average flame out time, standard deviation of the flame out time, as the total number of drips, and using statistical methods to convert that data to a prediction of the probability of first time pass, or "pFTP", that a particular sample formulation would achieve a V0 "pass" rating in the conventional UL94 testing of 5 bars. A pFTP as close to 1 as possible is most desirable. The probability of a first time pass on a first submission (pFTP) is determined according to the equation:

$$pFTP = (P_{t1 > mbt, n=0} \times P_{t2 > mbt, n=0} \times P_{total <= mbt} \times P_{drip, n=0})$$

where $P_{t1 > mbt, n=0}$ is the probability that no first burn time exceeds a maximum burn time value, $P_{t2 > mbt, n=0}$ is the probability that no second burn time exceeds a maximum burn time value, $P_{total <= mbt}$ is the probability that the sum of the burn times is less than or equal to a maximum total burn time value, and $P_{drip, n=0}$ is the probability that no specimen exhibits dripping during the flame test. First and second burn time refer to burn times after a first and second application of the flame, respectively. Here, a molded sample comprising the thermoplastic compositions and having a thickness of 2.0 mm, more specifically 1.8 mm, even more specifically 1.6 mm, and most specifically 1.5 mm, and can attain a pFTP of 0.85 or greater, specifically a pFTP of 0.9 or greater, and more specifically a pFTP of 0.95 or greater.

In a specific embodiment, a molded sample of the composition having a thickness of 2.5 mm achieves a UL94 flammability rating of V0 and a probability of first time pass (pFTP) value for V0 of at least 0.96. In another embodiment, a molded sample having a thickness of 2.0 mm achieves a UL94 flammability rating of V0 with a probability of first time pass (pFTP) value for V0 of at least 0.96.

In some embodiments the polysiloxane-polyimide block copolymer is halogen free. Halogen free is defined as having a halogen content less than or equal to 1000 parts by weight of halogen per million parts by weight of block copolymer (ppm). The amount of halogen can be determined by ordinary chemical analysis such as atomic absorption. Halogen free polymers will further have combustion products with low smoke corrosivity, for example as determined by DIN 57472 part 813. In some embodiments smoke conductivity, as judged by the change in water conductivity can be less than or equal to 1000 microSiemens. The smoke has an acidity, as determined by pH, greater than or equal to 5.

The composition can have equivalent or improved impact properties such as notched Izod impact strength (NII) at room temperature and at low temperature, compared to compositions without the combination of polycarbonate, polycarbonate-polysiloxane, and polysiloxane-polyimide block copolymer. For example, when measured at −40° C. in accordance with ASTM D256:2004, a molded bar comprising the composition and having a thickness of 3.2 mm has a notched Izod impact strength at least 5% greater than the composition lacking the polysiloxane-polyetherimide. In addition, or alternatively, a molded bar comprising the composition and having a thickness of 3.2 mm can have a notched Izod impact strength of 6 to 20 ft-lb/in, measured in accordance with ASTM D256:2004 at 23° C., and more specifically 10 to 20 ft-lb/in.

In an advantageous feature, the impact strength and other properties are significantly retained after hydro-aging. In one embodiment, a molded sample having a thickness of 3.2 mm has a notched Izod impact strength after hydro-aging for 3 days at 100° C. of 6 to 20 ft-lb/in at 23° C., measured in accordance with ASTM D256:2004. In one embodiment, a molded sample having a thickness of 3.2 mm has a notched Izod impact strength after hydro-aging for 3 days at 100° C. of greater than 7 ft-lb/in at 23° C., measured in accordance with ASTM D256:2004. In another embodiment, a molded bar comprising the composition without polysiloxane-polyimide that has been autoclaved for 2, 5, and 9 days at 100° C., is brittle after 5 days of autoclaving; however, the composition with polysiloxane-polyimide retains more than 50% of its ductility after 9 days of autoclave. In still another embodiment a molded sample having a thickness of 3.2 mm retains at least 50% of its initial notched Izod impact strength after hydro-aging for 3 days at 100° C., measured in accordance with ASTM D256:2004. In another embodiment a molded sample having a thickness of 3.2 mm retains at least 50% of its initial notched Izod impact strength after hydro-aging for 5 days at 100° C., measured in accordance with ASTM D256: 2004. A molded sample having a thickness of 3.2 mm can retain at least 50% of its initial notched Izod impact strength after hydro-aging for at least 9 days at 100° C., measured in accordance with ASTM D256:2004.

The compositions also have good heat deflection temperatures. A bar molded from the thermoplastic composition and having a thickness of 3.2 mm can have a heat deflection temperature of 60 to 90° C.

The thermoplastic compositions can also have a melt volume flow rate (MVR) of 5 to 15 cm$^3$/10 min measured in measured in accordance with ISO 1133 at 300° C./1.2 kg.

Yellowness index (YI) is a measure of the tendency of plastics to turn yellow upon long-term exposure to light. YI on 3.2 mm thick molded samples was measured in accordance with ASTM D1925-70:2004 with a Macbeth Color Eye 7000A Spectrometer. BY-Span is defined as the difference in the values of the yellowness index of transmission (YI-T) according to ASTM E313-00:2004 and the yellowness index of reflection (YI-R):

BY-Span=yellowness index in transmission−yellowness index in reflection

The YI-R is measured using the same equipment and parameters as the YI-T except that the equipment employs the reflection setting. The YI-R is generally negative. The compositions can have a yellowness index in transmission of from 0 to 20, more specifically 0 to 16; a yellowness index in reflection of −20 to 0, more specifically −18 to 0; and a BY-Span of 0 to 40, more specifically 0 to 34.

Transparency, as determined by luminous transmittance (% T) and haze (% H), on 3.2 mm thick molded samples was measured on a BYK-Gardner Haze Guard plus Hazemeter in accordance with the ASTM D1003-00 standard. A molded sample of the composition having a thickness of 3.2 mm has less than or equal to 8%, more specifically less than or equal to 6%, and most specifically less than or equal to 4% haze when measured according to ASTM D1003-00. Additionally, a molded sample of the composition having a thickness of 3.2 mm has at least 80%, more specifically at least 82%, even more specifically at least 85%, and most specifically at least 87% luminous transmittance when measured according to ASTM D1003-00.

In a specific embodiment, a 3.2 mm thick molded sample of the compositions has at least 80% luminous transmittance and less than or equal to 8% haze when measured in accordance with ASTM D1003-00, and a 3.2 mm thick molded sample retains has a notched Izod impact strength after hydro-aging 3 days at 100° C. of greater than 7 ft-lb/in, measured in accordance with ASTM D256:2004. In another specific embodiment, a 3.2 mm thick molded sample of the compositions has at least 85% luminous transmittance and less than or equal to 6% haze when measured in accordance with ASTM D1003-00, and a 3.2 mm thick molded sample retains more than 50% of its initial notched Izod impact strength after hydro-aging 5 days at 100° C., measured in accordance with ASTM D256:2004. In another specific embodiment, a 3.2 mm thick molded sample of the compositions has at least 85% luminous transmittance and less than or equal to 6% haze when measured in accordance with ASTM D1003-00, and a 3.2 mm thick molded sample retains more than 50% of its initial notched Izod impact strength after hydro-aging at least 9 days at 100° C., measured in accordance with ASTM D256: 2004. In another specific embodiment, a 3.2 mm thick molded sample of the composition has at least 85% luminous transmittance and less than 6% haze when measured in accordance with ASTM D1003-00, a 3.2 mm thick molded sample retains more than 50% of its initial notched Izod impact strength after hydro-aging 5 days at 100° C., measured in accordance with ASTM D256:2004, and a molded sample of less than 2.5 mm thickness has a UL94 flammability rating of V0. In this embodiment, a molded sample comprising the composition and having a thickness of 2.5 mm can have a probability of first time pass (pFTP) value for V0 of at least 0.96. In another specific embodiment, a 3.2 mm thick molded sample of the composition has at least 85% luminous transmittance and less than 6% haze when measured in accordance with ASTM D1003-00, a 3.2 mm thick molded sample retains more than 50% of its initial notched Izod impact strength after hydro-aging 5 days at 100° C., measured in accordance with ASTM D256:2004, and molded sample of 2.0 mm thickness has a UL94 flammability rating of V0. Further in this embodiment, a molded sample having a thickness of 2.0 mm can have a probability of first time pass (pFTP) value for V0 of at least 0.96.

The compositions can comprise lower molecular weight polycarbonates to increase flow properties at lower processing temperatures (e.g., as low as 230° C.), without significantly decreasing impact strength. The lower molecular weight polycarbonates accordingly provide a good balance among transparency, high flow, low processing temperature, and impact properties.

Also disclosed are articles comprising the composition. The compositions are thus useful in the manufacture of components of hand-held electronic devices such as personal digital assistants and cellular telephones, in particular lenses and combinations of lenses and covers. Other structural features that can be present include camera lens holes, curvatures, snap fixes, hollow-out areas, thin ribs or rings and other geometric structures.

EXAMPLES

Materials for the following examples are listed in Table 1.

TABLE 1

| Component | Description | Source |
|---|---|---|
| PDMS-PC-1 | Polysiloxane-polycarbonate copolymer comprising blocks of bisphenol A polycarbonate and blocks of polydimethylsiloxane (6 wt. % polysiloxane units, E = 45) | SABIC Innovative Plastics |
| PDMS-PC-2 | Polysiloxane-polycarbonate copolymer comprising bisphenol A carbonate units and polydimethylsiloxane (6 wt. % polysiloxane units, E = 30) | SABIC Innovative Plastics |
| PC-1 | Bisphenol A polycarbonate (Mn = 29 kg/mol measured by GPC against polystyrene standards); MVR at 300° C./1.2 kg = 5.1-6.9 g/10 min | SABIC Innovative Plastics |
| PC-2 | Bisphenol A polycarbonate (Mn = 18 kg/mol measured by GPC against polystyrene standards; MVR at 300° C./1.2 kg = 23.5-28.5 g/10 min | SABIC Innovative Plastics |
| PEI-Si | Polydimethylsiloxane-polyetherimide block copolymer with a 35-40 wt. % polysiloxane content and comprising structural units derived from m-phenylene diamine, bisphenol A dianhydride, and an aminopropyl terminated polydimethylsiloxane containing on average 10 silicon atoms; Mn = 24,000 (measured by GPC using polystyrene standards) (SILTEM ® STM-1500) | SABIC Innovative Plastics |
| Phosphite | Tris(2,4-di-t-butylphenyl)phosphite (IRGAPHOS ™ 168) | Ciba |
| KSS | Potassium diphenyl sulfone sulfonate | Exporters & Manufacturers of Intermediates for Dyes |

In the examples below, the compositions were extruded using a ZSK-25 twin screw extruder with a constant screw speed of 300 rpm, melt temperature set at 290 to 295° C. The compositions were injection molded using a 60-ton LT Demag Injection Molding machine with a screw diameter of 25 mm (millimeter), melt temperature set at 300 to 305° C., mold temperature set at 80° C., and cycle time from 40 to 45 seconds unless otherwise noted.

In the following tables, comparative examples are labeled with a prefix "C", and inventive examples are labeled with a prefix "E". The amount of each component is in weight percent, unless indicated otherwise. All properties were determined in accordance with the methods described above.

Examples E1, C1, and C2

Molded samples of three compositions comprising polycarbonate (PC-1 and PC-2), polysiloxane-polycarbonate (PDMS-PC-2), and polysiloxane-polyetherimide (PEI-Si) at 0, 2, and 3 wt. % were tested for optical properties and retention of notched Izod impact strength after hydro-aging. The results are shown in Table 2 below. Except where indicated, failure during impact measurement was ductile. A V1 or V2 rating indicates the sample was unable to achieve a V0 rating at any thickness tested.

TABLE 2

|  | C1 | E1 | C2 |
|---|---|---|---|
| Formulations (grams) | | | |
| PDMS-PC-2 (E = 30) | 40.5 | 40.5 | 40.5 |
| PC-1 | 41.5 | 41.5 | 41.5 |
| PC-2 | 18.0 | 16.0 | 15.0 |
| PEI-Si | — | 2 | 3 |
| Phosphite | 0.06 | 0.06 | 0.06 |
| Properties | | | |
| % T | 87.3 | 82.2 | 77.57 |
| % H | 4.99 | 6.89 | 12.83 |
| YI | 18.1 | 33.2 | 37.7 |
| | Non-Hydro-aged | | |
| NII at −40° C. (ft-lb/in) (St. Dev.) | 3.2 (0.7)[a] | 3.8 (0.3)[a] | 4.3 (0.2)[a] |
| NII at 23° C. (ft-lb/in) (St. Dev.) | 16.7 (0.3) | 16.2 (0.8) | 16.1 (0.9) |
| NII at 23° C. (ft-lb/in) (St. Dev.) | Hydro-aged at 100° C. | | |
| After 0 Days | 16.7 (0.3) | 16.2 (0.8) | 16.1 (0.9) |
| After 2 Days | 8.8 (0.5) | 13.2 (0.5) | 13.7 (0.6) |
| After 5 Days | 5.0 (2.9)[b] | 10.1 (0.4) | 11.5 (0.7) |
| After 9 Days | 1.7 (0.3)[a] | 8.2 (0.3) | 9.3 (0.8) |

TABLE 2-continued

|  | C1 | E1 | C2 |
|---|---|---|---|
| Summary | | | |
| % T ≧ 80% | Pass | Pass | Fail |
| % H ≦ 8% | Pass | Pass | Fail |
| NII > 6 ft-lb/in at 23° C. after 5 days | Fail | Pass | Pass |
| 50% Retention of NII at 23° C. after 5 days hydro-aging | Fail | Pass | Pass |
| 50% Retention of NII at 23° C. after 9 days hydro-aging | Fail | Pass | Pass |
| UL94 Flame Retardance Rating p(FTP) | V2 at 3 mm — — | V1 at 3 mm V0: 0.25 V1: 0.98 | V1 at 3 mm V0: 0.41 V1: 0.99 |

[a] brittle
[b] partially ductile

Table 2 shows that hydro-aged impact properties improved at increasing levels of PEI-Si, while luminous transmittance and haze reached an optimum value below about 3 wt. % PEI-Si. The comparative example C1, having no PEI-Si, passes for luminous transmittance of at least 80% and haze less than or equal to 8%, and fails for 50% retention of notched Izod impact strength at 23° C. after 5 or 9 days hydro-aging. Sample C2, with 3 wt. % PEI-Si, passes for 50% retention of impact strength after 5 and 9 days hydro-aging but fails for luminous transmittance and haze Sample E1, with 2 wt. % PEI-Si, passes for luminous transmittance, haze, and 50% retention of impact strength after 5 and 9 days hydro-aging.

A further advantage attributed to the presence of PEI-Si is seen in the FIGURE, a photograph of molded samples C1 (left, 0 wt. % PEI-Si) and E1 (right, 2 wt. % PEI-Si) after 5 days hydro-aging at 100° C. The photograph shows C1 is inhomogeneous and contains opaque specks, while sample E1 is visually uniform and speck-free.

Examples C3-C5 and E2-E7

Table 3 shows compositions having three levels of PEI-Si, and differing amounts of different types of polycarbonate-polysiloxane. Except where indicated, failure during impact measurement was ductile. A V1 or V2 rating indicates the sample was unable to achieve a V0 rating at any thickness tested.

TABLE 3

|  | C3 | E2 | E3 | C4 | E4 | E5 | C5 | E6 | E7 |
|---|---|---|---|---|---|---|---|---|---|
| Formulation (grams) | | | | | | | | | |
| PDMS-PC-1 | — | — | — | — | — | — | 83 | 83 | 83 |
| PDMS-PC-2 | 40.5 | 40.5 | 40.5 | 81.0 | 81.0 | 81.0 | — | — | — |
| PC-1 | 41.5 | 41.5 | 41.5 | 13.0 | 13.0 | 13.0 | 12.0 | 12.0 | 12.0 |
| PC-2 | 18.0 | 17.0 | 16.0 | 6.0 | 5.0 | 4.0 | 5.0 | 4.0 | 3.0 |
| PEI-Si | 0.0 | 1.0 | 2.0 | 0.0 | 1.0 | 2.0 | 0.0 | 1.0 | 2.0 |
| Phosphite | 0.06 | 0.06 | 0.06 | 0.06 | 0.06 | 0.06 | 0.06 | 0.06 | 0.06 |
| Properties | | | | | | | | | |
| YI-T | 5.2 | 8.6 | 12.8 | 4.0 | 6.3 | 8.1 | 10.4 | 13.4 | 16.1 |
| YI-R | −8.3 | −11.6 | −15.0 | −6.4 | −6.3 | −6.1 | −16.5 | −18.8 | −18.3 |
| BY-Span | 13.5 | 20.2 | 27.9 | 10.4 | 12.6 | 14.2 | 26.9 | 32.2 | 34.4 |
| % T | 89.10 | 87.2 | 83.8 | 90.1 | 89.2 | 88.3 | 86.6 | 85.0 | 83.1 |
| % H | 2.4 | 3.7 | 5.6 | 2.0 | 2.4 | 2.8 | 2.8 | 3.9 | 5.0 |
| NII at 23° C. (ft. lb/in) (Std. Dev.) | Hydro-aged At 100° C. In Autoclave | | | | | | | | |
| after 3 days | 5.5[b] (3.2) | 8.9 (0.5) | 11.3 (0.3) | 6.5 (0.7) | 7.4 (0.7) | 7.5 (0.6) | 7.0 (0.3) | 7.6 (0.2) | 8.4 (0.6) |

TABLE 3-continued

|  | C3 | E2 | E3 | C4 | E4 | E5 | C5 | E6 | E7 |
|---|---|---|---|---|---|---|---|---|---|
| after 10 days | 2.0[a] (0.1) | 1.6a (0.3) | 4.1b (3.3) | 2.8a (1.6) | 2.9 b (1.5) | 5.2 (0.6) | 5.6 (0.3) | 6.1 (0.3) | 7.0 (0.8) |
| UL94 Flame Retardance Rating | V2 at 3 mm | V2 at 3 mm | V1 at 3 mm | V1 at 3 mm | V1 at 3 mm | V1 at 3 mm | V0 at 3 mm | V0 at 3 mm | V0 at 2.3 mm |
| p(FTP) | — — | — — | V0: 0.25 V1: 0.98 | V0: 0.35 V0: 0.99 | V0: 0.0 V1: 0.98 | V0: 0.33 V1: 0.99 | V0: 0.97 V1: 0.99 | V0: 0.75 V1: 0.99 | V0: 0.99 V1: 1.0 |
| Summary |  |  |  |  |  |  |  |  |  |
| % T ≧ 80% | Pass | Pass | Pass | Pass | Pass | Pass | Pass | Pass | Pass |
| % H ≦ 8% | Pass | Pass | Pass | Pass | Pass | Pass | Pass | Pass | Pass |
| NII > 7 ft-lb/in after 3 days hydro-aging | Fail | Pass | Pass | Fail | Pass | Pass | Fail | Pass | Pass |

[a]brittle
[b]partially ductile

Samples were graded as "pass" if the notched Izod impact strength at 23° C. after 3 days hydro-aging was greater than 7 ft-lb/in. Only the compositions comprising PEI-Si (E2-E7) in Table 3 met this threshold. E2 and E7 each exceeded 8 ft-lb/in, and E3 exceeded 11 ft-lb/in. All examples in Table 3 also passed for luminous transmittance and haze as described previously for the examples in Table 2.

The data in Table 3 show that improvement in flame retardance is linked to three factors: the amount of PEI-Si present in the compositions, the total amount of siloxane in the compositions, and the number of siloxane units in the polycarbonate-polysiloxane copolymer. The total siloxane content is lowest in C3, E2, and E3. Each of these compositions comprises 40.5 wt % of PDMS-PC-2, which contains 6% siloxane, wherein E=30. The total siloxane content in these compositions is about 2.4 wt. %. C3 and E2, which contain 0 or 1.0 wt % of PEI-Si respectively, achieve a UL-94 rating of V2 at a thickness of 3.2 mm Increasing the amount of PEI-Si to 2.0 wt. %, as in E3, results in a 3.2 mm sample achieving a UL94 rating of V1. This rating is similar to the UL94 ratings achieved by some samples containing higher total amounts of siloxane, in particular C4, E4, and E5.

C4, E4, and E5 have a siloxane content 4.9 wt %. Each composition contains 81 wt. % of PDMS-PC-2, which contains 6% siloxane, wherein E=30. Here, each composition achieves a UL94 rating of V1 at a thickness of 3.2 mm Addition of 1.0 or 2.0 wt. % of PEI-Si does not change the UL94 rating. Thus, the amount of PEI-Si used is critical where the total amount of siloxane is the compositions is relatively low, as shown by C3, E2, and E3, and less important where the total amount of siloxane is higher, as shown by C4, E4, and E5.

The siloxane content in C5, E6, and E7 is very close to that of C4, E4, and E5, being 5.0 wt. % (83 wt. % of polycarbonate-polysiloxane PDMS-PC-1, which contains 6 wt. % siloxane). However, E=45 in this polycarbonate-polysiloxane. It can be seen that in each of these examples, molded compositions having a thickness of 3.2 mm or less achieve a UL94 V0 rating. Addition of 1.0 wt. % PEI-Si does not change the V0 rating, but addition of 2.0 wt. % of PEI-Si allows a thinner sample (2.3 mm) to achieve a V0 rating. Thus, use of all three of higher amounts of siloxane in the compositions, longer siloxane chain lengths in the polycarbonate-polysiloxane, and PEI-Si provides the best flame retardance in thin samples.

Examples E8-E11, and C6-C9

Molded samples of the compositions comprising PEI-Si were also more flame retardant while still retaining acceptable optical properties. Table 4 compares the effect of adding PEI-Si and a known flame retardant, potassium diphenyl sulfone sulfonate salt (KSS), on the UL94 flammability ratings and the optical properties. Each sample's UL94 rating (V0 or V1) at the indicated thickness is shown in Table 4. A thinner sample for a given rating indicates greater flame retardance. A V1 rating indicates the sample was unable to achieve a V0 rating at any thickness tested.

TABLE 4

|  | C6 | E8 | C7 | E9 | C8 | E10 | C9 | E11 | C10 |
|---|---|---|---|---|---|---|---|---|---|
| Formulation (g) |  |  |  |  |  |  |  |  |  |
| PDMS-PC-1 | 833 | 833 | — | — | 833 | 833 | — | — | — |
| PDMS-PC-2 | — | — | 833 | 833 | — | — | 833 | 833 | — |
| PC-1 | 117 | 117 | 117 | 117 | 117 | 117 | 117 | 117 | 700 |
| PC-2 | 50 | 50 | 50 | 50 | 50 | 50 | 50 | 50 | 300 |
| PEI-Si | — | 20 | — | 20 | — | 20 | — | 20 | 20 |
| Phosphite | 0.3 | 0.3 | 0.3 | 0.3 | 0.3 | 0.3 | 0.3 | 0.3 | 0.3 |
| KSS | 3 | 3 | 3 | 3 | — | — | — | — | — |
| Properties |  |  |  |  |  |  |  |  |  |
| % T | 85.2 | 82.3 | 88.9 | 87.4 | 86.7 | 84.2 | 89.9 | 88.3 | 77.8 |
| % H | 6.1 | 7.1 | 4.8 | 4.5 | 2 | 3.1 | 1.5 | 2.5 | 28.2 |
| YI | 10.7 | 17.3 | 4.6 | 10.5 | 10.9 | 18.5 | 4.5 | 11 | — |
| MVR at 300° C./1.2 Kg (cc/10 min) | 12.4 | 12.7 | 9.3 | 9.9 | 10.1 | 10.6 | 8.4 | 8.6 | — |

TABLE 4-continued

| | C6 | E8 | C7 | E9 | C8 | E10 | C9 | E11 | C10 |
|---|---|---|---|---|---|---|---|---|---|
| UL94 Flame Retardance Rating at thickness in mm | V0 at 3 mm | V0 at 2 mm | V0 at 3 mm | V0 at 2 m | V0 at 3 mm | V0 at 2.3 mm | V1 at 3 mm | V1 at 3 mm | ** |
| PFTP | V0: 0.97 | V0: 0.96 | V0: 0.97 | V0: 0.97 | V0: 0.97 | V0: 0.99 | V0: 0.35 | V0: 0.33 | — |
| PFTP | V1: 0.99 | V1: 0.99 | V1: 0.99 | V1: 1.00 | V1: 0.99 | V1: 1.00 | V1: 0.99 | V1: 0.99 | |
| Summary | | | | | | | | | |
| % T ≧ 80% (pass/fail) | Pass | Pass | Pass | Pass | Pass | Pass | Pass | Pass | — |
| % H ≦ 8% (pass/fail) | Pass | Pass | Pass | Pass | Pass | Pass | Pass | Pass | — |
| UL94 V0 at <2.5 mm (pass/fail) | Fail | Pass | Fail | Pass | Fail | Pass | Fail | Fail | — |

**Haze was unacceptable, so flame retardance testing was not performed

As shown in C10, addition of a polysiloxane-polyimide block copolymer (PEI-Si) to a composition containing only polycarbonate in the polymer component results in a composition having an unacceptably high haze. However, PEI-Si is added to a composition containing both polycarbonate and a polysiloxane-polycarbonate copolymer, a synergistic effect results in excellent properties, particularly low haze.

All of the other samples in Table 4 passed for haze and luminous transmittance, but differences were observed in the effects of PEI-Si and KSS on the flame retardancy. The results indicate that addition of KSS alone at a level of 0.3 wt. % had little effect on the flammability rating of the compositions containing PDMS-PC-1 (compare C6 and C8), but KSS improved the flammability rating of the compositions containing PDMS-PC-2 (compare C7 and C9). On the other hand, PEI-Si alone at 2 wt. % had no apparent effect on the compositions containing PDMS-PC-2 (compare C9 and E11), but PEI-Si improved the flammability rating of the composition containing PDMS-PC-1 (compare E10 and E11). E10 achieved a V0 rating at 2.3 mm with a probability of a first time pass (pFTP) for V0 of at least 0.96. Surprisingly, the most significant improvement in flammability rating was obtained when PEI-Si and KSS were added to a composition comprising PDMS-PC-2. Thus, E9 has a V0 rating at 2.0 mm with a probability of a first time pass (pFTP) for V0 of at least 0.96. The same composition without KSS achieved a V1 rating at 3 mm (E5 in Table 3 or E11 in Table 4). The combination of PEI-Si and KSS appears to synergistically enhance flame retardance more than would be expected based on additive effects alone.

The terms "a" and "an" as used herein do not denote a limitation of quantity, but rather denote the presence of at least one of the referenced item. As used herein, "combinations thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and can or can not be present in other embodiments. In addition, it is to be understood that the described element(s) can be combined in any suitable manner in the various embodiments.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges directed to the same component or property are inclusive of the endpoint and independently combinable. All ASTM tests are based on the 2004 edition of the Annual Book of ASTM Standards unless otherwise indicated.

All molecular weights in this application refer to weight average molecular weights unless indicated otherwise. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

While the invention has been described with reference to the embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A composition, comprising, based on the total weight of the polymer components in the composition,
   1 to 40 wt. % of an aromatic polycarbonate;
   30 to 98.8 wt. % of a polysiloxane-polycarbonate block copolymer comprising
     carbonate units of the formula

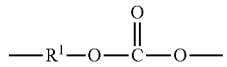

wherein at least 60 percent of the total number of $R^1$ groups are $C_{1-60}$ aromatic organic radicals and the balance thereof are aliphatic, alicyclic, or aromatic radicals, and polysiloxane units of the formula

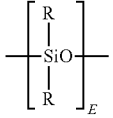

wherein R is independently the same or different $C_{1-13}$ monovalent organic group, and E has an average value of 10 to 100; and 0.1 to 10 wt. % of a polysiloxane-polyimide block copolymer comprising more than 20 wt. % polysiloxane units, based on the total weight of the polysiloxane-polyimide copolymer; wherein a 3.2 mm thick molded sample comprising the composition has less than or equal to 8% haze and at least 80% luminous transmittance, measured in accordance with ASTM D1003-00, and a 3.2 mm thick molded sample comprising the composition retains more than 50% of its initial notched Izod impact strength of 6 to 20 ft-lb/in at 23° C. after hydro-aging for 5 days at 100° C., measured in accordance with ASTM D256:2004.

2. The composition of claim 1, wherein a molded sample comprising the composition and having a thickness of 3.2 mm has a notched Izod impact strength after hydro-aging for 3 days at 100° C. of greater than 7 ft-lb/in at 23° C., measured in accordance with ASTM D256:2004.

3. The composition of claim 1, wherein the polysiloxane-polyimide block copolymer is a polysiloxane-polyetherimide block copolymer and a molded sample comprising the composition and having a thickness of 3.2 mm has a notched Izod impact strength at least 5% greater than the composition lacking the polysiloxane-polyetherimide, each measured in accordance with ASTM D256:2004.

4. The composition of claim 1, wherein a molded sample comprising the composition and having a thickness of 3.2 mm has less than or equal to 6% haze, measured according to ASTM D1003-00.

5. The composition of claim 1, wherein a molded article comprising the composition and having a thickness of 3.2 mm has at least 85% luminous transmittance, measured according to ASTM D1003-00.

6. The composition of claim 1, wherein a molded sample comprising the composition and having a thickness of 2.3 mm has a UL94 flammability rating of V0.

7. The composition of claim 1, wherein the polycarbonate units are derived from bisphenol A.

8. The composition of claim 1, further comprising 0.01 to 5 parts of an aromatic sulfonate salt based on 100 parts by weight of the total weight of the polymers in the composition, wherein a molded sample of the composition having a thickness of 2.0 mm has a UL94 flammability rating of V0.

9. The composition of claim 8, wherein the aromatic sulfonate salt is potassium diphenyl sulfone sulfonate.

10. A method of manufacture of a composition, comprising melt blending the components of the composition of claim 1.

11. A method of forming an article, comprising injection molding, extrusion, injection blow molding, gas assist blow molding, or vacuum forming the composition of claim 1 to form the article.

12. An article comprising the composition of claim 1.

13. The composition of claim 1, wherein the polycarbonate is a bisphenol A polycarbonate, the polysiloxane-polycarbonate comprises bisphenol A carbonate units and polysiloxane carbonate units derived from a dihydroxy polysiloxane of the formula

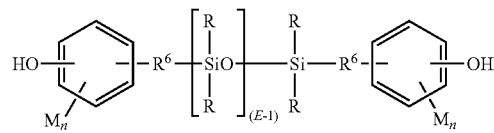

wherein R is methyl, $R^6$ is propylene, E has an average value of 20 to 50, M is methoxy, and n is 1; the polysiloxane-polyimide block copolymer is a polysiloxane-polyetherimide block copolymer comprising polysiloxane units of the formula

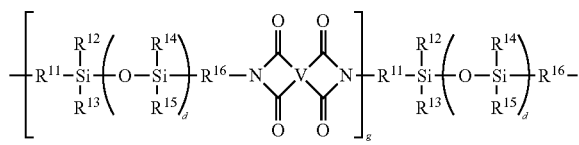

wherein each $R^{11}$ and $R^{16}$ are the same $C_{1-12}$ alkylene groups, $R^{12}$ to $R^{15}$ are each methyl groups, d is 1 to 20, g is 2 to 20, and wherein V is of the formula

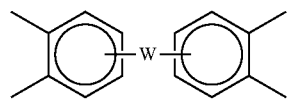

wherein W is a group of the formula —O—Z—O—, the divalent bonds of the —O— or the —O—Z—O— group are in the 3,3', 3,4', 4,3', or the 4,4' positions, and Z is of the formula

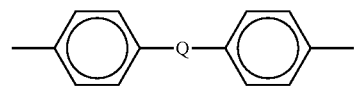

wherein Q is 2,2-propylene, the polyetherimide blocks of the polysiloxane-polyetherimide block copolymer comprise units of the formula

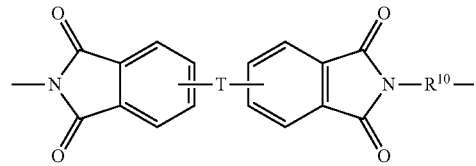

wherein $R.sup.10$ is propyl, and T is

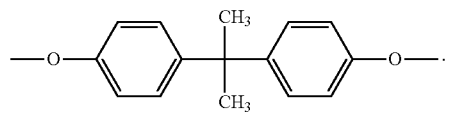

14. The composition of claim 13, further comprising an aromatic salt.

15. The composition of claim 14, wherein the aromatic salt is potassium diphenyl sulfone sulfonate.

* * * * *